3,228,949
BASIC-SUBSTITUTED THIOESTERS OF
CARBAMIC ACID
Klaus Heinz Risse, Ulrich Hörlein, and Wolfgang Wirth,
all c/o Farbenfabriken Bayer A.G., Wuppertal-Elberfeld,
Germany
No Drawing. Filed Oct. 15, 1959, Ser. No. 846,538
Claims priority, application Germany, Sept. 18, 1958,
F 26,629
1 Claim. (Cl. 260—294.8)

This invention is a continuation-in-part of application Serial No. 840,228, filed September 16, 1959, now abandoned.

This invention relates to and has as its object the production of novel basic-substituted thioesters of carbamic acid, which have been found to constitute valuable pharmaceutical products distinguished by special antispasmodic activity.

The novel basic-substituted thioesters of carbamic acid, in accordance with the invention, have the general formula

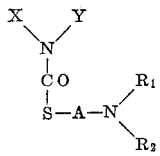

in which X and Y represent a possibly substituted phenyl radical or a possibly substituted heterocyclic radical, A represents a straight or branched chain aliphatic radical, $R_1$ and $R_2$ represent alkyl radicals or alkylene radicals, either of which may be branched or a cycloalkyl group. $R_1$ and $R_2$ may be joined with one another or with a carbon atom of A to form a five-, six- or seven-membered nitrogen containing heterocyclic ring, such as piperidine, pyrrolidine, morpholine, thiomorpholine or piperazine ring, which may possibly be substituted. The thiomorpholine configuration may possibly be in the corresponding sulfoxide or sulfone form.

The basic-substituted thioesters of carbamic acid of the above formula may be used in the form of the free base, in the form of the salts of these bases or as quaternary ammonium compounds.

The conversion of the bases in accordance with the invention into the corresponding quaternary ammonium compounds may be effected in a conventional manner, as for example by reacting the same in an ether solution with a dimethyl sulfate.

The basic-substituted thioesters of carbamic acid in accordance with the invention may be prepared by reacting an amine having the general formula.

in which X and Y represents a possibly substituted phenyl radical or a possibly substituted heterocyclic radical with phosgene to form the corresponding N-disubstituted carbamyl chloride. The N-disubstituted carbamyl chloride formed is then reacted with a basic thioalcohol having the formula

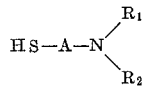

in which A, $R_1$ and $R_2$ are as given above.

It is also possible to produce the novel basic-substituted thioesters of carbamic acid in accordance with the invention by reacting the N-disubstituted carbamyl chlorides which, in place of the tertiary amino group, have a substituent convertible into an amino group, as for example a hydroxyl group or possibly a protected amino group, a halogen atom or a nitrile or a carbonamide group, and by effecting the conversion into the novel compounds of the invention in accordance with conventional methods.

Furthermore, the novel basic-substituted thioesters of carbamic acid may be prepared by reacting the amines of the formula

with compounds of the formula

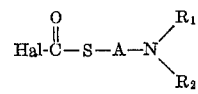

in which A, $R_1$ and $R_2$ are as given above and in which Hal represents a halogen atom, as for example chlorine, bromine or iodine.

In this latter instance, the starting N-disubstituted amines may alternately be reacted with a thiohaloformic acid ester which, in lieu of the tertiary amino group, contains a group which is convertible into such an amino group, as for example an hydroxyl group, a protected amino group, a halogen atom or a nitrile or carbonamide group, and subsequently converting this group into the substituted amino group of the formula

in the conventional manner.

As an alternate method of producing the novel basic-substituted thioesters of carbamic acid, the starting N-disubstituted amines are converted into their metal compounds, as for example the corresponding sodium, potassium, magnesium or lithium compounds, and reacting the metal compound with carbon oxysulfide to form the corresponding salts of thiocarbamic acids. The thiocarbamic acid salt formed is then reacted with a reactive ester of a basic alcohol of the general formula

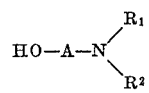

in which A, $R_1$ and $R_2$ are as given above.

The aforegoing synthesis may also be carried out by reacting the starting N-disubstituted amine with an ester of an alcohol which, in lieu of the tertiary amino group, has a substituent convertible into an amino group, a halogen atom, or a nitrile or a carbonamide group, and by effecting the conversion into the compounds in accordance with conventional methods.

The following examples are given by way of illustration and not limitation:

EXAMPLE 1

40 g. of diphenylcarbamyl chloride is refluxed in 700 cc. of benzene with 28 g. of diethylaminoethylthiol and 21 g. of triethylamine for 2 hours. After cooling, the product is filtered off by vacuum, the filtrate is washed four times with 100 cc. aliquots of water, and the base is extracted with dilute acetic acid. The acetic acid solution is washed with ether, alkalinized, and the base taken up with ether. After drying and evaporation of the ether, the residue is distilled, giving 35 g. of β-diethylaminoethylthiol diphenyl-carbamate of B.P.$_{0.01}$ 120–126° C. M.P. of hydrochloride: 180–181° C.

EXAMPLE 2

50 g. of 2-pyridylaniline is dissolved in 150 cc. of chloroform and, over a period of several hours, a vigorous stream of phosgene is introduced, while the temperature is kept from rising above 40° C. by cooling. The mixture is allowed to stand overnight and then vacuum-filtered and evaporated. The residue is taken up with 250 cc. of benzene, mixed with 40 g. of diethylaminoethylthiol and 30 g. of triethylamine, and boiled under reflux for 2 hours. The work-up is accomplished as described in Example 1, yielding β-diethylaminoethylthiol phenyl-2-pyridylcarbamate of B.P.$_{0.01}$ 150–160° C.

EXAMPLE 3

A mixture of 45 g. of di-(n)-butylaminoethylthiol, 21 g. of triethylamine and 50 cc. of benzene is instilled into a boiling solution of 47 g. of diphenylcarbamyl chloride in 250 cc. of benzene, and boiling is continued for a period of 4 hours. Next, the mixture is filtered by vacuum, and the benzene solution is extracted with dilute phosphoric acid; the work-up otherwise conforms to that described in Example 1. Obtained is 46 g. of β-dibutylaminoethylthiol diphenylcarbamate of B.P.$_{0.01}$ 180° C. (retort with large diameter) which, upon recrystallization from methanol, melts at 59–60° C.

EXAMPLE 4

9 mixture of 16 g. N′-methylpiperazyl-N-β-ethylthiol, 11 g. triethylamine and 50 cc. benzene is instilled into a boiling solution of 23.2 g. diphenylcarbamyl chloride in 350 cc. benzene, and the mixture is allowed to boil for 4 hours. It is then worked up as described in Example 1. Evaporation of the ether solution gives β-(N′-methylpiperazyl-N-ethyl)-thiol diphenylcarbamate as a solid residue which, after recrystallization from ligroin, melts at 122–123° C. Yield: 14 g.

EXAMPLE 5

28.8 g. diphenylcarbamyl chloride, 13 g. β-dimethylaminoethylthiol and 13.5 g. triethylamine are heated to the boil in 400 cc. benzene and boiled for 4 hours. Work-up according to Example 1 gives 25 g. of β-dimethylaminoethylthiol diphenylcarbamate of B.P.$_{0.01}$ 130° C. (retort), the maleate of which melts at 145–146° C.

EXAMPLE 6

Phosegne is introduced, first at room temperature and then for several hours at 100° C., into a solution of 30.6 g. of 3-chlorodiphenylamine in 300 cc. of xylene. Subsequently, about 100–150 cc. of the solvent is evaporated in vacuo and is replaced by benzene. Then a mixture of 20 g. diethylaminoethylthiol, 16 g. triethylamine and 500 cc. benzene is instilled at an internal temperature of about 80° C., and the mixture is boiled for 4 hours. Proceeding as described in Example 1, 46.8 g. of β-diethylaminoethylthio 3-chlorodiphenylamine-N-carboxylate of B.P.$_{0.01}$ 148–150° C. is obtained, the hydrochloride of which melts at 145–146° C.

EXAMPLE 7

If the reactions described in Example 6 are carried out with 4-chlorodiphenylamine instead of 3-chlorodiphenylamine, using the same proportions under the same conditions, 32 g. of β-diethylaminoethylthiol 4-chlorodiphenylamine-N-carboxylate of B.P.$_{0.01}$ 145–150° C. is obtained, the hydrochloride of which melts at 145–146° C.

EXAMPLE 8

Reactions according to Example 6 with 2-chlorodiphenylamine instead of 3-chlorodiphenylamine lead to 30 g. of β-diethylaminoethylthiol 2-chlorodiphenylamine-N-carboxylate of B.P.$_{0.02}$ 155° C., the hydrochloride of which melts at 163–165° C.

EXAMPLE 9

Phosgene is introduced into a solution of 30 g. of 2-methoxydiphenylamine in 300 cc. of xylene, during 2 hours at room temperature and during several more hours at 100° C. Subsequently, about 100–150 cc. of the solvent is evaporated under vacuum, and this amount is replaced by benzene. Then a mixture of 20 g. diethylaminoethylthiol, 16 g. triethylamine and 50 cc. benzene is instilled at an internal temperature of about 80° C., and the mixture is boiled for 4 hours. It is worked up as described in the foregoing, giving 39.4 g. of β-diethylaminoethylthiol 2-methoxydiphenylamine-N-carboxylate of B.P.$_{0.01}$ 160–165° C. (retort), the hydrochloride of which melts at 153–155° C.

EXAMPLE 10

If the reactions described in Example 9 are carried out with 3-methoxydiphenylamine instead of 2-methoxydiphenylamine, the product resulting consists of 26 g. of the (β-diethylaminoethyl)-thioester of 3-methoxydiphenylamine-N-carboxylic acid of B.P.$_{0.01}$ 160–164° C., the hydrochloride of which melts at 132–135° C.

EXAMPLE 11

Use of 4-methoxydiphenylamine instead of 2-methoxydiphenylamine in the reactions described in Example 9 leads to a good yield of the (β-diethylaminoethyl)-thioester of 4-methoxydiphenylamine-N-carboxylic acid. This boils at 170° C. under 0.01 mm. of mercury, and its hydrochloride melts at 158–159° C.

EXAMPLE 12

If the reactions described in the preceding examples are carried out with xylene and benzene as solvents and with 13.1 g. 4-methyldiphenylamine, phosgene, 9.5 g. diethylaminoethylthiol and 7.6 g. triethylamine, the product obtained consists of 20.2 g. of β-diethylaminoethylthiol 4-methyldiphenylamine-N-carboxylate of B.P.$_{0.01}$ 158–163° C., the hydrochloride of which melts at 159–160° C.

EXAMPLE 13

Use of xylene and benzene as solvents with 20.5 g. 2-methyldiphenylamine, phosgene, 28.6 g. diethylaminoethylthiol and 13.4 g. triethylamine in the reactions described in the preceding examples leads to 24.7 g. of β-diethylaminoethylthio 2-methyldiphenylamine-N-carboxylate of B.P.$_{0.01}$ 140° C., the hydrochloride of which melts at 157–159° C.

EXAMPLE 14

If the reactions described in the above examples are carried out with xylene and benzene as solvents, using 87 g. 4-ethoxydiphenylamine, phosgene, 91.4 g. diethylaminoethylthiol and 42.7 g. triethylamine, 122 g. of the (β-diethylaminoethyl)-thioester of 4-ethoxydiphenylamine-N-carboxylic acid, of B.P.$_{0.05}$ 180° C., is obtained, the hydrochloride of which melts at 147–149° C.

EXAMPLE 15

If the reactions are carried out with xylene and benzene as solvents and with 55 g. 2-ethoxydiphenylamine, phosgene, 58.5 g. diethylaminoethylthiol and 27.3 g. triethylamine, the product obtained consists of 64.8 g. β-diethylaminoethylthiol 2-ethoxydiphenylamine-N-carboxylate with B.P.$_{0.01}$ 145° C.; its naphthalene-1,5-disulfonate melts at 216–218° C.

The novel basic substituted thioesters of carbamic acid have been found to be eminently suitable for use (1) As an antispasmodic for the treatment of spasms of smooth muscles, especially in the area of stomach and intestinal tract and and in the urogenital-system,
(2) As anti-ulcer agent in the stomach and intestinal tract,
(3) As an agent for the treatment of depressions (psychiatrics), for which purpose it is interesting because it contains an excitant component of efficacy.

In the treatment of spasmodic and colic-type symtoms, atropine and atropine-type compounds occupy a predominant position. The main effect of these compounds is of a parasympathicolytic nature, i.e. in the relaxation of the smooth muscles. Additionally these compounds produce so-called side-effects, as, for instance, mydriasis, in the pupil, cessation of secretory activity in the salivary glands etc. and are utilized therapeutically for these purposes or for their so-called side-effects. Their use in the treatment of spasmodic conditions leaves a great deal to be desired and a constant search is being carried on in the hope that new compounds will be found in which the side-effects are of secondary importance and in which the desired antispasmodic activity is not essentially impaired.

With a view to the efficacy of using the parasympathicolytically acting antispasmodics in the treatment of ulcers of the stomach and intestinal tract, a complete repression of the secretion of those organs would be undesirable.

The novel basic substituted thioesters of carbamic acid have been found to be eminently suitable for this purpose.

The basic substituted thioesters of carbamic acid and in particular β-diethylaminoethylthiol diphenylcarbamate (Example 1) were subjected to numerous tests as hereinafter outlined for the purpose of pharmacologically evaluating the same. As comparison materials Lorusil, atropinesulfate, Buscopane, Artane, banthene and papaverine were employed. The concentration and/or dosage data in the following data has been given with reference to the salts of these materials which were used in each case. The base portion for each material amounted to the following β-diethylaminoethylthiol diphenylcarbamate 90%, Lorusil 85%, atropinesulfate 83%, Buscopane 82%, Artane 89%, banthene (Banthine) 82% and in papaverine 90%.

(1) Antispasmodic effect on intestine

The antispasmodic effect of each of the above materials was tested according to the procedure described by Magnus employing the isolated guinea pig intestine.

In the following table there are indicated the dilutions of β-diethylaminoethylthiol diphenyl carbamate and in comparison therewith the effectiveness of each of atropine, Artane Lorusil and of papaverine, to diminish by one half the intestinal contractions produced by acetylcholine and/or nicotine and/or bariumchloride (the so-called DE 50). The contractions of the intestine were produced in each instance by $1:2 \times 10^6$ acetylcholine or $1:10^6$ nicotine or by $1:10^4$ bariumchloride.

TABLE I

| Material | Anti-ACh | DE 50 in γ/liter, anti-nicotine effect | Anti-BaCl₂ effect |
|---|---|---|---|
| β-diethylaminoethylthiol diphenyl carbamate | 50 | 70 | 150 |
| Lorusil | 640 | 240 | 1,100 |
| Atropine | 25 | 290 | |
| Buscopane | 390 | >10,000 | |
| Artane | 38 | 34 | 25 |
| Banthine | 105 | | |
| Papaverine | | | 5,800 |

(2) Antispasmodic effect on the non-gravid uterus

Isolated uteri of rabbits, which had been isolated for several weeks to ensure that the animals were not pregnant were employed in this test procedure carried out according to the procedure described by Magnus. β-diethylaminoethylthiol diphenyl carbamate was employed for comparison with Lorusil and atropine.

(a) *Adrenaline* ($1:10^6$) stimulated uteri preparations were employed.

1 mg. β-diethylaminoethylthiol diphenyl carbamate/liter—without effect.
10 mg. β-diethylaminoethylthiol diphenyl carbamate/liter—reduced the tonus mostly by ⅓–½.
50 mg. β-diethylaminoethylthiol diphenyl carbamate/liter—by ½–⅗ of the starting height.
100 mg. β-diethylaminoethylthiol diphenyl carbamate/liter—made the tonus succumb almost entirely, only a slight peristaltic contraction still could be detected.

The effect of the β-diethylaminoethylthiol diphenyl carbamate corresponded qualitatively and quantitatively to approximately that of Lorusil and to about ⅓–½ that observed for atropine.

(b) *Hypophysin* (1 VE) stimulated uteri were employed.

1 mg. β-diethylaminoethylthiol diphenyl carbamate/liter—without effect.
10 mg. β-diethylaminoethylthiol diphenyl carbamate/liter—without effect or led to slight decrease of tonus.
100 mg. β-diethylaminoethylthiol diphenyl carbamate/liter—resulted in tonus decrease of varying extent, the peristaltic contraction was strongly diminished.

The β-diethylaminoethylthiol diphenyl carbamate had approximately the same effect as did Lorusil.

(3) Anti-nicotine action in the mouse

In the mouse the DL 50 for the nicotine base lies at 1.5 mg./kg. via subcutaneous administration.

Tests were performed to ascertain to what extent the nicotine-DL 50 could, by the preliminary administration of β-diethylaminoethylthiol diphenyl carbamate be pushed up, and thus the effectiveness of the test material to detoxicate a nicotine dose.

It was established that by preliminarily administering 5 mg. β-diethylaminoethylthiol diphenyl carbamate /kg. subcut. a maximum of nicotine-detoxication could be obtained. With this concentration there are detoxicated 3.2 of the otherwise lethal nicotine doses. With atropine, which was employed for purposes of comparison, the maximum of the nicotine-detoxication was established with preliminary administration of 100 mg./kg. atropine subcut. However even with this relatively high atropine dose only two otherwise lethal nicotine-doses are detoxicated.

(4) Anti-ulcer-effect in the Shay rat

Shay (Gastroenterology 5, 43–61, 1945) has described the production of stomach ulcers in fasting rats after establishing pylorus ligature. This method was carried out in brief in the following manner:

Male rats were fasted for 48 hours, then the pyrolus ligature was applied under ether narcosis and subsequently β-diethylaminoethylthiol diphenyl carbamate administered subcutaneously. In controls which were treated with a corresponding amount of physiological saline solution, stomach ulcers appeared within 8–16 hours. In contrast, reduced doses of 50 mg. of β-diethylaminoethylthiol diphenyl carbamate administered subcutaneously, reduced the number of ulcers observed about one half, or only superficial bleedings and mucous membrane lesions occurred. By comparison, for the production of about the same anti-ulcer effect 10 mg. Artane and/or 25 mg. atropine and/or 100 mg. Buscopane/kg. subcutaneous were necessary.

(5) Anti-ulcer effect in the "stress rat"

Rossi and Bonfils (Compt. rend Soc. Biol. 150, 2124, 1956) have observed that in rats, which for 24 hours are fettered without narcosis and while fasting, ulcerations and bleedings in the mucous membranes of the stomach are produced. There may additionally be formed one to several deep ulcers.

This observation was the starting point of the working out of a method which permits a far-reaching and quantitative evaluation of this stress reaction and of the effectiveness of agents to combat the same.

Under the test conditions as here chosen after only 6 hours the stress ulcers, are already observed; the strongest changes lying in the glandular stomach in contrast to the Shay rat where the ulcerations mainly take place in the fore-stomach. From this it may be concluded that the reactions of the stress rat are more closely related to the ulcer genesis in humans than is the case in the Shay rat.

With preliminary subcutaneous injection or oral administration of β-diethylaminoethylthiol diphenyl carbamate in suitable dosage, the formation of stress ulcers may be avoided. At most, an occasional slight mucous membrane bleeding is observed.

In the following table the DE 50 for β-diethylaminoethylthiol diphenyl carbamate and comparative materials are given as well as the amount of material administered to reduce the number of ulcers and the severity of the lesions to one half the control value. These figures were ascertained according to an evaluation process, which in principle corresponds to the method of F. Pauls, Wick, A. M., McKay, E. M. (Gastroenterology 8, 774, 1947).

TABLE II

|  | DE 50 in mg./kg. | |
|---|---|---|
|  | Subc. | Per os |
| β-diethylaminoethylthioldiphenyl carbamate | 11 | 34 |
| Atropine | 1 | 4.5 |
| Banthine | 2 |  |
| Buscopane | 16 |  |
| Lorusil | 70 |  |

(6) Antihistamine action

In guinea pigs, which were treated with a histamine spray (0.15% histamine-dichloride in aqueous solution) by the procedure outlined by Schaumann, 10 mg./kg. of β-diethylaminoethylthiol-diphenyl carbamate subcutaneous led in 2 animals to complete protection for 10 minutes, in 1 animal no effect could be observed. 1 mg./kg. of β-diethylaminoethylthiol-diphenyl carbamate subcutaneous showed in one animal a weak protective effect, in 2 animals this dosage remained without effect.

(7) Effect in the eye of the cat 50 cm. of a 1.1% solution of β-diethylaminoethyl-thiol-diphenyl-carbamate in physiological saline solution was permitted to drip into the ocular conjunctival sac of the cat, and was observed to produce no reaction of the pupil. A 1% solution enlarged the pupil clearly for about 3 hours.

In comparison, after a 0.1% atropine-sulfate-solution had been permitted to drip in, a mydriasis of several hours occurs.

Following the subcutaneous injection of 5 mg. of β-diethylaminoethylthiol-diphenyl carbamate/kg. in the cat, a slight enlargement of the pupil was observed. 1 mg./kg. was without effect. In contrast, following 0.1 mg./kg. of atpropine sulfate administered subcutaneously of a demonstrable pupil enlargement occurs.

(8) Effect on the saliva secretion

Through intravenous infusion of 0.025 mg. pilocarpine/kg./min. there was produced in the rabbit a profuse flow of saliva. In the above instance the infusion volume amounted to 0.25 ml./min.

In the following are indicated the doses of β-diethylaminoethylthiol-diphenyl carbamate of atropine, Buscopane, Artane, Lorusil, which when intravenously injected lower the saliva flow by about 50%.

TABLE III

| | DE 50 in γ/kg. |
|---|---|
| β-Diethylaminoethylthiol-diphenyl carbamate | 90 |
| Atropine sulf. | 8 |
| Banthine | 15 |
| Buscopane | 20 |
| Artane | 26 |
| Lorusil | 200 |

(9) Sympathicolytic effect

In the narcotized cat the nicked skin contraction which occurs in preganglionic electrical irritation of the neck-sympathicus was observed. 1–5 mg. of β-diethylaminoethylthiol-diphenyl carbamate/kg. administered intravenously led to no change of this reaction. Thus in this range, the test substance does not possess any ganglion-paralyzing or sympathicolytic effect.

(10) Heart and circulation effect (a) *Isolated guinea pig heart according to Lagendorff.*— In the isolated guinea pig heart the dosages of 1–50γ of β-diethylaminoethylthiol-diphenyl carbamate led mostly to slight decrease of amplitude, however practically to no flow passage change in the coronaries.

(b) *Blood pressure effect—cat, narcotized.*—1–5 mg./kg. of β-diethylaminoethylthiol-diphenyl carbamate intravenously: Tendency to slight increase in blood pressure for about 10–30 minutes.

(c) *Dog, non-narcotized.*—In 2 dogs intravenous injection of 1 mg./kg. of β-diethylaminoethylthiol-diphenyl carbamate did not lead to any essential changes of the systolic and diastolic pressure, however to a fleeting frequency increase by about 15 pulse beats. The animals were restless subsequent to the injections.

(11) Effect on the central nervous system

The clear excitation component which became apparent, in all animal types used for the test, with the oral and parenteral administration of the material, caused a closer examination of this phenomena to be carried out.

(a) *Effect on the monoamino-oxidase.*—Certain of the known materials having an exciting effect have been found to interfere i.e., inhibit the enzyme monoamino-oxidase. In vitro, with swine's liver and tyramine as substrate 1 mg./ml. of β-diethylaminoethylthiol-diphenyl carbamate the ferment was inhibited to 60%, and thus only to a moderate extent.

(b) *Stimulating effect (test on the "sloped incline" with mice).*—Of a group of mice the majority of the mice which were placed at the lower edge of a slopingly positioned board, climbed within a short time to the upper edge. However, the minority of the animals did not carry out this climbing reflex Tests were conducted to show that apparently animals whose normal drive is reduced can be stimulated by administration of β-diethylaminoethylthiol-diphenyl carbamate to this reflex, that is, with 10 mg./kg. per os about 40%, with 20 mg. about 60% and with 50 mg. almost 100% of the animals with the so-called reduced drive could be stimulated to climb the slant board. By comparison, employing pervitine at 1 mg./kg. per os only 50% of the animals were stimulated into the carrying out of this reflex activity.

(c) *Anti-tremorine effect in the mouse.*—Mice who have received tremorine subcutaneously and who are then placed in a water bath sink in water after only a short time, while control animals are able to swim about for hours. Through the preliminary administration of products of the type of akinetone and parpanite the tremorine effect may be counterated. β-diethylaminoethylthiol-diphenyl carbamate possesses anti-tremorine activity approximately of the same extent as the compounds above named.

(d) *Effect on the arousal reaction in the electroencephalogram.*—In rabbits which are awake the irritation threshold for the arousal reaction in the cortex and hippocampus was clearly increased by 5 mg. of β-diethylaminoethylthiol-diphenyl carbamate intravenously. The electrical irritation was instigated by means of deep electrodes placed in the formatio reticularis, the hypothalamus and the lateral thalamus. The test compound in accordance with the invention was demonstrated to, when the same was used in equal dosage to be distinctly stronger than atosil, without the attendant sedation associated with atosil (see Wirth and Hoffmeister Arch. Exper. Path. Pharm. 236, 103, 1958).

(e) *Analgesic effect.*—In the mouse no analgesic effect could be demonstrated in the heat radiation test performed as described by Wolff, Hardy and Goodell when doses of 10–50 mg./kg. of β-diethylaminoethylthiol-diphenyl carbamate was administered subcutaneously. However, with these dosages there occurred clear excitation.

(12) *Tolerance*

(a) *Acute toxicity.*—

TABLE IV

| | DL 50 in mg./kg. | | | | |
|---|---|---|---|---|---|
| | β-diethyl-aminoethyl-thiol-di-phenyl carbamate | Atropine | Artane | Banthine | Lorusil |
| Mouse, i.v | 35 | 80 | 39†† | 30 | 82 |
| Mouse, sbc | 150 | | | | 235 |
| Mouse, p. os | ca. 400 | 400† | 350 | 460† | 560 |
| Rat, sbc | 450 | | | | >1,000 |
| Rat, p. os | 450 | | | | >1,000 |
| Rabbit, i.v | >20 | | | | 18 |
| Cat, sbc | >10 | | | | |

When the β-diethylaminoethylthiol-diphenyl carbamate was employed in these toxicity determinations, there was observed an excitory component which for instance in the mouse was recognizable already at 5–10 mg. I.V. and which with 20–30 mg. produced cramps, which cramp state was prolonged. Similarly with the subcutaneous administration of the β-diethylaminoethylthiol-diphenyl carbamate the excitatory reaction was easily recognizable, for example in the mouse at approximately from 10 mg./kg., in the rat approximately from 50 mg./kg., dog I.V. from 1 mg./kg., cat sbc. at 5 mg./kg.

(b) *Subchronic toxicity.*—3 cats received on 8 subsequent working days 10 mg. of β-diethylaminoethylthiol-diphenyl carbamate/kg. sbc. During this period there was observed a lack of desire for food, restlessness and enlargement of the pupil. Following the 8 day test period the same animals were administered a dosage reduced to 1 mg./kg. and maintained thereon for a further 13 days.

One animal died after the 7th day of injection of concurrent infection. In the other two cats no disturbances were noticeable in their condition: in the urine (albumin, sugar, urobilinogen) and in the blood (hemoglobin, white and red corpuscles, differential blood picture) no changes appeared. Also the liver function showed in the BSP test and in the thymol turbidity test no deviation from the norm. 3 weeks after termination of the drug administration there appeared in one animal, a weight increase of 450 g., the other animal had, after a temporary loss, again reached its original weight. This animal was killed one month after the last drug administration had taken place. The autopsy showed macroscopically no peculiarities. Histological examination of the kidneys, suprarenal capsule, were without significant findings.

In a further test series, 3 cats were daily administered 1 mg. of α-diethylaminoethylthiol-diphenyl carbamate sbc. on 21 subsequent days (no treatment on Sundays being carried out). While 2 animals tolerated this treatment without any change in their behavior and with slight weight increase (on the last day of injection 1 animal +200 g.), the third animal after the 12th injection expired. This animal had a blood picture which showed a slight increase of the white corpuscles, and which might indicate a concurrent infection. In the autopsy of this animal there was found on both sides a distended polycystic kidney which, of course, has nothing to do with the effect of the preparation, but which might explain a lowered resistance.[1]

The two other animals as in the first test series demonstrated no urine or blood abnormalities, nor any pathological liver function (BSP and thymol turbidity test). One of the animals was killed 3 weeks after the end of the drug administration. Macroscopically no abnormalities were observed and the same was true for histological examination of the liver, kidney and suprarenal capsule.

(c) *Local irritability.*—To determine local irritability there were employed β-diethylaminoethylthio-diphenyl carbamate as isotonic 0.2 and 0.5% solutions of pH 6.5 and a 2% solution of pH 6.2 in physiological saline.

RABBIT EAR, INTRACUTANEOUS INJECTION

Intracutaneous injection of 0.1 ml. of the 0.2% or of the 0.5% solution of β-diethylaminoethylthiol-diphenyl carbamate was entirely without irritating effect. The same amount of the 2% solution led in one animal to a slight reddening, in 2 additional animals to an inflammatory infiltrate at the site of injection.

RABBIT EAR, VENOUS TOLERANCE 0.1 ccm. of the 0.5% solution was injected into the marginal vein of the rabbit ear (with stasis of the vein for 1 minute), but resulted in 2 animals in no noticeable signs of irritability.

RAT THIGHS, I.M. INJECTION

The 0.5% solution was given by injection of 0.1 ml. I.M. into the rat thigh. The autopsy of two animals each, after 24 hours and 48 hours showed no evidence of local irritability.

In animals in which a 2% solution of pervitine was employed under the same conditions, there was found when the autopsy of the test animals were carried out after 24 hours or 48 hours following treatment an inflammatory infiltration at the site of the injection.

HUMAN (SUBCUTANEOUS)

5 volunteer test subjects received a subcutaneous injection in the dorasal side of the forearm of 0.2–0.5 mol of the sterile and isotonic 0.2% solution of β-diethylaminoethylthiol diphenyl carbamate in physiological saline, without the appearance of any signs of irritation.

SUMMARY

In the following table a series of results have been summarized, which are referred to atropine, whose effect is set at =100.

---

[1] Histologically there was found an astonishing abundance of fat, otherwise no further significant results in the liver, kidneys and suprarenal capsule.

TABLE V

| Effect | Test object | Atropine | β-diethyl-aminoethylthiol diphenyl carbamate | Lorusil | Buscopane | Artane | Banthine |
|---|---|---|---|---|---|---|---|
| Anti-acetylcholine | Isol. Mee skin | 100 | 50 | 4 | 6 | 66 | 24 |
| Anti-nicotine | Isol. Mee skin | 100 | 400 | 120 | 3 | 850 | |
| Uterus adr. stimulated | Isol. rabbit uterus | 100 | 30–50 | 30–50 | | | |
| Anti-ulcer | Shay-rat, sbc | 100 | 50 | 25 | 25 | 250 | |
| Anti-ulcer | Stress-rat, sbc | 100 | 9 | 1 | 6 | | 50 |
| Anti-salivation | Pilocarpine | 100 | 9 | 4 | 40 | 31 | 53 |
| Mydriasis | Rat eye | 100 | ~5 | | | | |

In the above table values define that percentage of the atropine effect obtained with the various materials listed.

Thus it has been demonstrated that β-diethylaminoethylthiol diphenyl carbamate corresponds with respect to the anti-acetylcholine effect to one-half of the *atropine effect*. The same is true for the anti-adrenaline effect on the uterus and for the ulcer preventing effect in the Shay rat. In the "stress rat" β-diethylaminoethylthiol diphenyl carbamate possesses 1/10 of the atropine effect. In contrast βldiethylaminoethylthiol diphenyl carbamate is four times as strong as atropine in its *anti-nicotine effect* in vitro, distinctly stronger and effective in smaller dosage in the nicotine-detoxication in the intact animal. The BaCl$_2$-contracture in the isolated organ is lowered to an essentially stronger extent than by papaverine by the β-diethylaminoethylthiol diphenyl carbamate.

*Side-reactions*, such as inhibition of the salivary secretion and mydriasis, are triggered only with a 10 and/or 20 fold higher dosage of β-diethylaminoethylthiol diphenyl carbamate.

In comparison to the anti-spasmodic Lorusil β-diethylaminoethylthiol diphenyl carbamate in almost all test applied.

A remarkable characteristic of the product in contrast to atropine and Lorusil is its excitory action which makes it useful, to employ β-diethylaminoethylthiol diphenyl carbamate other than as an anti-spasmodic, as anti-depressive agent in psychiatry.

The tolerance of the product in a single administration corresponds approximately to that of the known materials Artane and Banthine. In the subchronic application in the cat the product proved to be well tolerated. 0.2–0.5% solutions are in parenteral administration without local irritation, while the 2% solution produces in subcutaneous application some local irritation.

In view of the above tests β-diethylaminoethylthiol diphenyl carbamate would appear to be suitable for control of *spasms* of the urinary tracts, of the uterus, of the gall bladder tracts and of the stomach-intestinal tract, as well as in ulcers ventriculi and duodeni.

As dosages therefor are suggested:

0.2% solution, 0.5–1 ml. sbc. or I.M. as ED for adults corresponding to 1–2 mg. effective material, if necessary several times a day.

Grooved tablets of β-diethylaminoethylthiol diphenyl carbamate of 20 mg., ED starting with ½–1 tablet, if necessary increased to 1–2 tablets can alternately be used.

The dosage suggestion for use in psychiatry is 1–2 ml. of the 2% solution =2–4 mg. effective material in adults as ED.

Grooved tablets of β-diethylaminoethylthiol diphenyl carbamate at 20 mg. ED 1 tablet, if necessary increased to 2 to 3 times a day.

In view of the tremendous range of tests carried out, the work and time necessarily involved, all of the test results were obtained employing β-diethylaminoethylthiol diphenyl carbamate. However incomplete test data presently available would appear to indicate that other examples of the compounds of the invention produce in the tests substantially equivalent results.

We claim:

β-diethylaminoethylthiol phenyl-2-pyridyl-carbamate.

References Cited by the Examiner

UNITED STATES PATENTS

| | | | |
|---|---|---|---|
| 2,060,733 | 11/1936 | Hunt et al. | 91—68 |
| 2,323,940 | 7/1943 | Sloan | 260—793 |
| 2,325,720 | 8/1943 | Urbschat et al. | 167—22 |
| 2,772,288 | 11/1956 | Cusic | 260—326.3 |
| 2,772,289 | 11/1956 | Cusic | 260—326.3 |
| 2,775,539 | 12/1956 | Staughton | 167—65 |
| 2,793,157 | 5/1957 | Close | 167—65 |
| 2,914,533 | 11/1959 | Clinton | 260—295 |
| 2,933,519 | 4/1960 | Sekera et al. | 260—472 |

FOREIGN PATENTS 688,726  3/1953  Great Britain.

WALTER A. MODANCE, *Primary Examiner.*

I. MARCUS, H. J. LIDOFF, *Examiners.*